PHONOGRAPH RECORD PLAYER SPINDLE

Original Filed July 29, 1948 3 Sheets-Sheet 1

Inventor

REUBEN C. CARLSON

Feb. 12, 1957 R. C. CARLSON 2,781,198

PHONOGRAPH RECORD PLAYER SPINDLE

Original Filed July 29, 1948 3 Sheets-Sheet 2

REUBEN C. CARLSON

J. W. Douglas
His Attorney

PHONOGRAPH RECORD PLAYER SPINDLE

Original Filed July 29, 1948 3 Sheets-Sheet 3

Inventor
REUBEN C. CARLSON

J. D. Douglas
His Attorney

United States Patent Office 2,781,198

Patented Feb. 12, 1957

2,781,198

PHONOGRAPH RECORD PLAYER SPINDLE

Reuben C. Carlson, River Grove, Ill., assignor to Admiral Corporation, Chicago, Ill., a corporation of Delaware Original application July 29, 1948, Serial No. 41,388. Divided and this application August 8, 1951, Serial No. 240,921

6 Claims. (Cl. 274—10)

This invention pertains to phonograph record changers, and particularly to a spindle for a record changer adapted to guide a record in a path determined by the spindle. This application is a division of my co-pending application, Ser. No. 41,388 filed July 29, 1948.

In a record changer of the type disclosed in my aforesaid application where the records are transferred singly from a record magazine to a turntable, it is necessary that the record be properly centered on the turntable by a carrier means. Heretofore, in this type of changer, it has been customary to transport the records through an arcuate path by means of a carrier pivoted at one edge, which receives a record from the magazine and carries it to the turntable. This type of device positioned the record by engagement of ears or the like with the periphery of the records. Thus it was possible to play records of only one size at any given time.

By my invention, I am able to play records of intermixed sizes. This is accomplished by use of a central spindle to guide the records in a predetermined path by engagement of the spindle with the center hole in the record. The spindle is preferably formed with a particular rate of curvature and has a novel construction to inhibit vibrations of audible frequency which would cause undesirable noise during the changing of the record.

A more complete understanding of my invention may be had by reference to the accompanying drawings and following description which are parts of this specification.

Figures 6, 7, 8, 9:
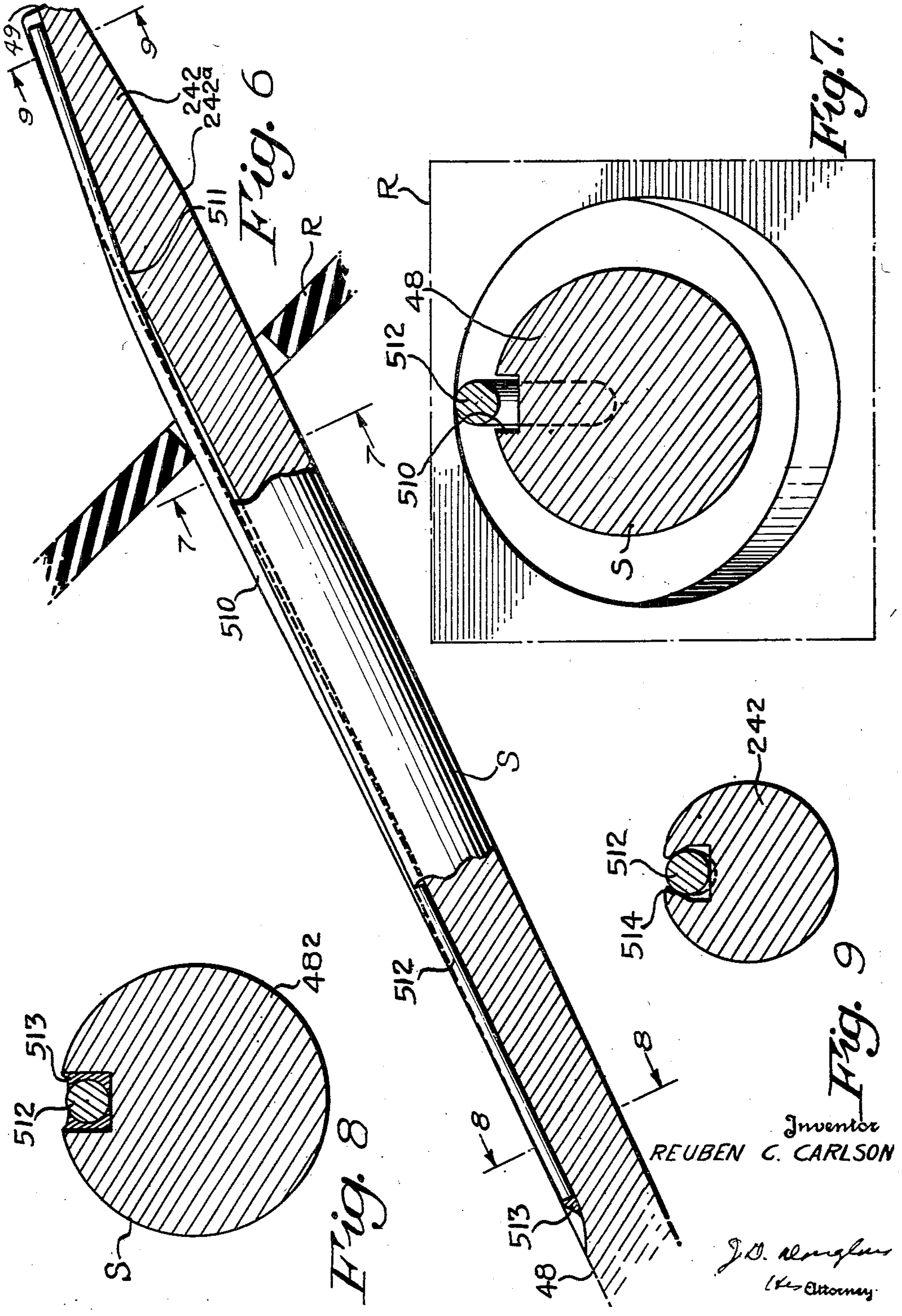
Fig. 6 is an enlarged partial view similar to Fig. 4 of an alternative type of spindle.
Fig. 7 is an enlarged sectional view from line 7—7 of Fig. 6.

Figs. 8 and 9 are views similar to Fig. 7 from lines 8—8 and 9—9 respectively of Fig. 6.

Figures 3, 4, 5:
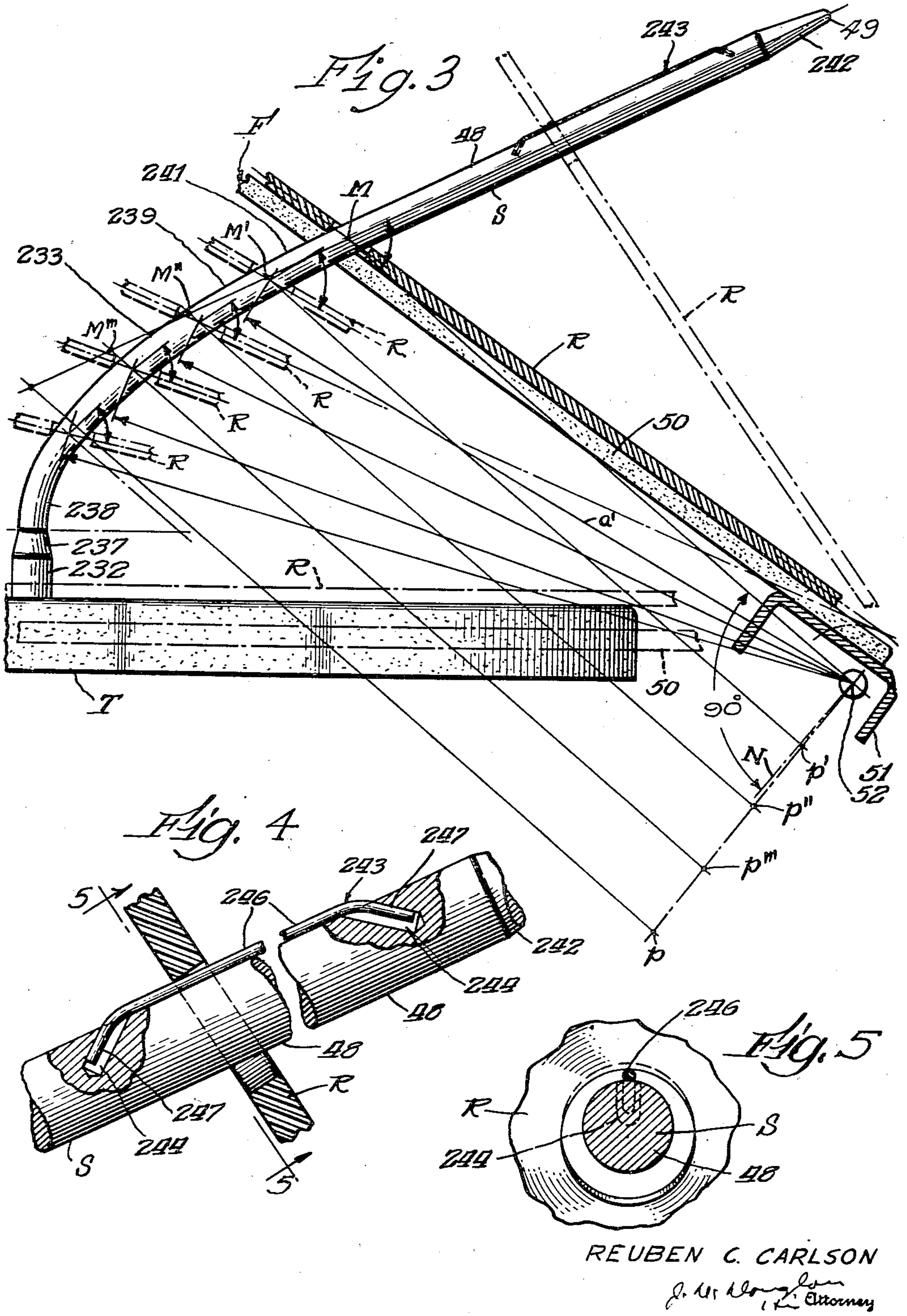
Fig. 3 is a side elevational view of one form of the spindle.
Fig. 4 is an enlarged partial elevational view of the spindle shown in Fig. 3, parts being broken away to show the mode of attachment of a slide part.
Fig. 5 is a sectional view from line 5—5 of Fig. 4.

As more fully described in the parent application, Ser. No. 41,388 filed July 29, 1948, of which this is a division, my record changer includes a magazine means 6 including a base 39 which supports the bottom edge of the records; a prop member 99 held in spaced relation to the base by a side bracket 101, which supports the upper edges of the records in a leaning position; and a side member 41 at the base to prevent the records from sliding off the base member. The records are removed from the magazine by means fully described in my aforesaid application. For the purpose of the present application, the process may be described as follows:

The records R are raised singly over the edge 44 of the member 41 and are dropped onto flanged pins 47 on levers 45. These pins are carried to their upward or record receiving position by means not here shown, and then after receiving the record are lowered. During the lowering of the record, it slides away from the prop member 99 and tilts, free of any lateral support, until it engages the end 49 of the spindle S. Further lowering of the record causes the center hole of the record to be threaded over the spindle. From this point, the record is lowered to the turntable T by a lowering mechanism including a flap 50 fixed to a cross beam 51 which in turn is pivoted to a lateral member 57 by a pin 162 located at a transverse axis 52 (Fig. 3). This mechanism is operated by means, not shown here, to be raised when the record is in position to engage the spindle and then to be lowered with the record until the record lies in place on the turntable. It will be seen, however, that while the flap 50 carries the record, the spindle is guiding it, and therefore the outer diameter of the record is completely immaterial and records of any size can be accommodated because of the center hole rather than the peripheral edge as a guide.

Figures 1, 2:
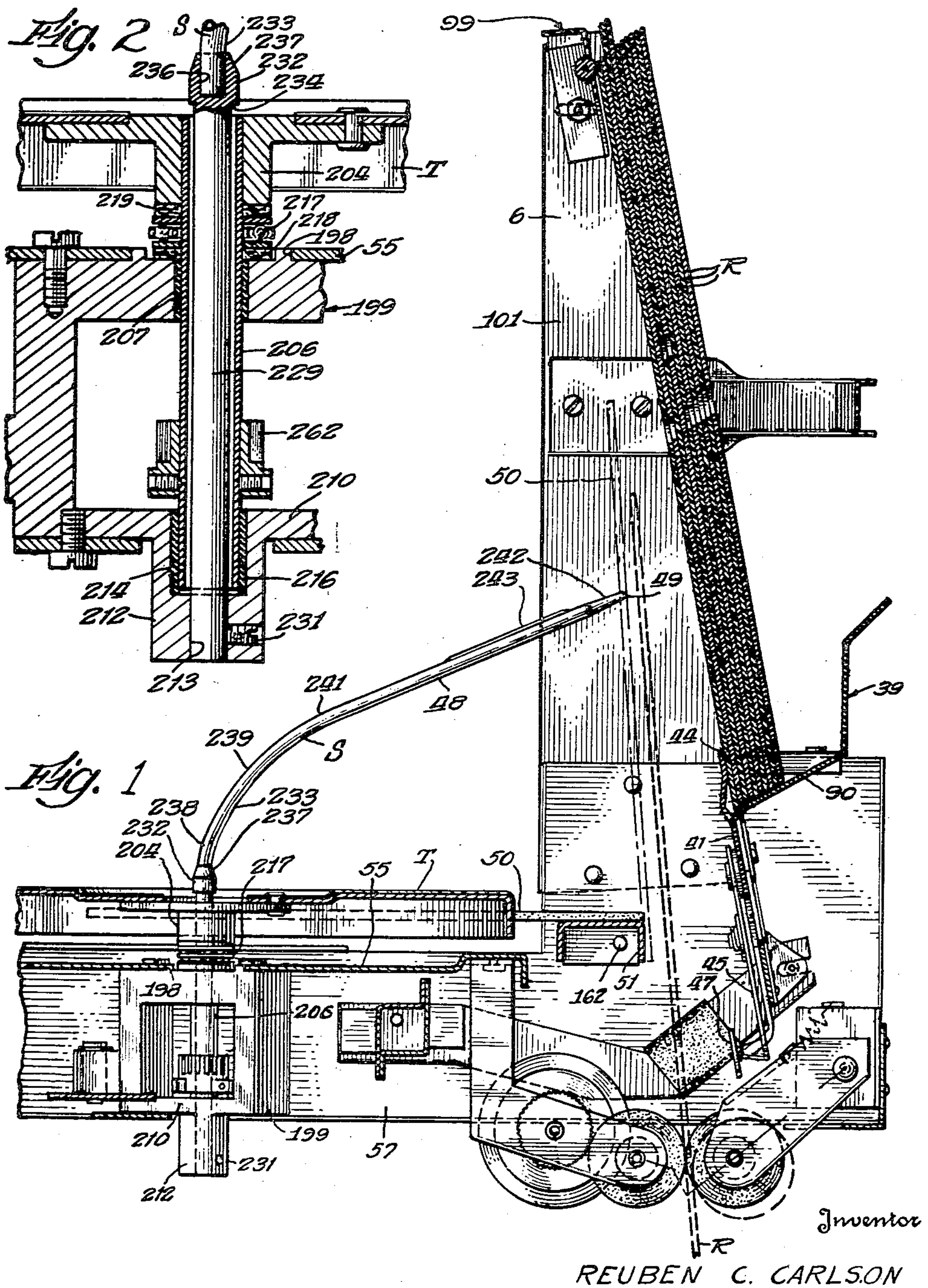
Fig. 1 is a partial sectional view of a record changer taken on the center line of the turntable showing my novel spindle in one embodiment.
Fig. 2 is an enlarged sectional view similar to Fig. 1 of the base of the spindle.

The turntable T is mounted on the base plate 55 which in turn is fixed to the side members 57. A bearing bracket or frame 199 is fixed to the base plate 55 beneath an aperture 198. Bearing bushings 207 and 216 are pressed into this bracket and provide bearings for a tubular shaft 206 to which the turntable is fixed. A suitable thrust bearing 217 cushioned in felt washers 218 and 219 is engaged between the hub 204 of the turntable and the top of the frame 199 (Fig. 2). A pinion 262 is also fixed to the shaft 206 and drives operating mechanism not important to the invention herein described but fully described in my co-pending application. A boss 212, on the bottom member 210 of the frame 199, is formed with a bore 213 for the reception of one end of the spindle S.

Novel features are incorporated in the spindle S (Fig. 2). It includes three essential portions namely, a base portion 229, which is received in the bore 213 and where it is rigidly and adjustably held by a set screw 231, an intermediate or record engaging portion 232 adapted to extend through the center hole of a record while the same is supported by the turntable T and a guide portion or cam portion 233 which is adapted to guide the center hole of the record into engagement with the playing portion. As will be noted, the base portion 229 is of reduced diameter with respect to the intermediate portion 232, and also of diameter less than the internal diameter of the sleeve 206 so that said base portion, throughout its length, is segregated from vibrations or lateral play of the shaft 206. Also to this end, a shoulder 234 at the base of the intermediate portion 232 is additionally spaced slightly from the turntable T. The diameter of the guide portion 233 is less than the diameter of the intermediate portion for a purpose which will be explained hereinafter. In addition, the surface of the guide portion 233 is of mirror-like finish, it being preferably plated with chromium and polished so that the spindle may offer little friction to the passage of records thereover. If desired, the guide portion 233 and the remainder of the spindle may be made in two sections, as indicated, the lower end of the guide portion being fitted in a bore 236, in the intermediate portion, with which the bore is coaxial. The two parts of the spindle are, of course, rigidly held together and this is a convenient mode of manufacture. Additionally, a section of the sides of the playing portion 232 is conical, thus providing a surface 237 to guide, by a camming action, a record from the guide portion into operative engagement with the playing portion. From the intermediate portion 232 the guide portion 233 curves rather abruptly at 238 (Fig. 1) to more gentle curvilinear portion 239 into which the curvature 238 blends. In turn, the curvilinear section 239 is blended into the straight section 48 by a more abrupt curved section 241. Toward the free end 49, the spindle may also include a section 242 which is tapered with the aim of improving the record-engaging quality of the spindle. The centerline of section 242, at least, is in the vertical, medial plane defined by the axes of the center holes of the records as they are moved vertically when supported by the pins 47.

In operation, when the records were allowed to slide by gravity over a part of the straight section 48, it was found that some records produced a squeaking noise due to friction with the surfaces of the spindle which caused it to vibrate at a high frequency. I have found that this trouble can be avoided by use of a slender rib 243 disposed on the upper side of the section 48. A convenient manner in which the rib 243 may be provided is shown in Fig. 4 wherein holes 244, slanting in opposite directions in the upper side of the section 48, are adapted to receive therein, the two ends of a section of wire 246 of a resilient nature, such as steel piano wire. The wire 246 includes anchorate portions 247 which are deflected to only a sufficient degree beyond their elastic limit to permit their insertion in the holes 244, from which they are resistant to removal by virtue of their tendency to straighten, and thereby cause that part of the wire between the holes to hug the surface of the spindle. Although, as shown in Figs. 3 and 4, the wire may lie close to the spindle, in actual practice it is found that the wire may be spaced from the spindle. This is more clearly shown in Figs. 6 to 9 inclusive. Herein I have shown a groove 510 which extends from the portion 48, along the spindle, including the slanting part 242 to the end 49 thereof. This groove is of varying depth, being deepest at the end toward the section 48 and uniformly decreasing in depth toward the end of the spindle being shallowest at 511 which is slightly spaced from the junction point of the conical section with the end of the point 49. It then increases in depth from the point 242*a* to the end of the spindle. The groove, as can best be seen in Fig. 7, is slightly wider than the wire 512. The wire 512 may be secured in the groove as indicated at 513 by brazing, soldering, or staking. At the extremity of the spindle, the wire is preferably secured by staking as indicated at 514. Due to the inclination of the part 242, this has a tendency to bow the wire out of the groove. Because the wire may move sidewise in the groove, any tendency to vibrate is in a frequency beyond the audible range.

The shape of the spindle S is critical insofar as the diameter, curvature and slant of the guide portion 233 are concerned. To understand the reasons for this, it should primarily be recognized that the size of records which are to be reproduced are of a substantially predetermined size, namely, ten and twelve inches in diameter. In a console style of radio-phonograph cabinet, of average size, the space is rather limited. Therefore, where the foregoing principle of manipulating a record is involved; that is, the principle of transferring a record, by means including a bent spindle from a substantially vertical to a horizontal position, one of the problems was that of making it possible for a record to slide freely over the curved surface without sticking. This was due to conditions which will be understood by reference to Fig. 3. Therein it will be noted that from a point where the center hole of a record becomes initially engaged by the section 48, the axis of the record swings increasingly away from coaxial relationship with the axis of the spindle until the record approaches the axis of the intermediate portion 232, when the axis of the record swings back toward and finally into substantially coaxial relationship to the axis of the spindle. It will therefore be understood that the farther the axis of the records swings out of alignment with the axis of the spindle, the nearer the edges defining the center hole of the record approach the axis of the spindle, and consequently approach opposite sides of the spindle. Of necessity, the diameter of the guide portion 233 had to be made less than the diameter of the intermediate portion 232. This involved sacrificing rigidity of the spindle, a desirable quality due to the length of the same. Accordingly, it was ascertained that the diameter of the guide portion 233 could be increased to a maximum if the axis of the curved portion thereof defined a logarithmic curve, for the greater part of its length. Therefore, from a radius, beginning at the vertical part of the axis, the logarithmic curved portion of the axis continues to the axis of the inclined, straight section 48 into which it blends. To construct the curved part of the axis it should first be assumed that, with respect to the horizontal axis 52, the end 49 bears a definite vertical and lateral relationship; also that the axis of the section 48 slants downwardly from the end 49. The inclination from the horizontal is only just enough to provide for motion by gravity of a record over the section 48 in view of the friction offered to passage of the record by the spindle. Preferably, the section 48 is inclined at an angle of about 25 degrees from a horizontal. Through a point M, the approximate point where the curvature begins, and the axis 52 of the flap F a straight line is drawn. At an angle of 1 degree, counterclockwise from a line N52, perpendicular to the line M52, a straight line *p*52 is drawn. Then the line *p*52 is divided into equal sections indicated by the points $p'$, $p''$, $p'''$, etc., and straight lines are drawn through each of these points parallel to line M52 and intersecting a straight continuation of the axis of section 48 at points M', M'', M''', etc. Then with a radius $M'p'$ and the axis 52 as a center, an arc $a'$ is struck transversely of line $M'p'$. Another arc having a radius M'M is struck about M and intersecting the first arc. The point of intersection of the arcs is on the logarithmic curved portion of the spindle. Another point on this arc is found as follows: Using $M''p''$ as a radius and 52 as a center, an arc is struck transversely of line $M''p''$, which arc is intersected by another arc drawn about M as center and M''M as a radius. Additional intersecting arcs drawn about M with radius M'''M and with radius $M'''p'''$ circumscribed about 52, respectively, thus provide points through which a line is drawn by the assistance of a French curve until it reaches the proximity of the intermediate portion 232 where the logarithmic curve is joined to a vertical line representing the vertical portion of the spindle's axis by a radius of convenient length.

Although a spindle which includes a logarithmic curvature between the portions 48 and 232 provides an ideal contour due to uniformity of space between the sides of the spindle and walls of the center hole of a record when said record is slid over the spindle as described, there are other means of generating a suitable curved portion. For example, it was found by test that two or more suitable radii, drawn about appropriately-located centers, could be used to approximate the logarithmic curvature.

Thus, it is apparent that I have provided a spindle particularly adapted for the purpose of guiding records in a predetermined path from a magazine to a turntable, both because of its particular form and because of the unique slide member which served to damp the vibration caused by a sliding record. It will be apparent to those skilled in the art that the exact shape of the spindle and extent of the slide bar are not critical and that approximate shapes and varying lengths of bar may be used without exceeding the scope of the invention as described in the following claims.

Having thus described my invention, I am aware that numerous and extensive departures may be made there-from without departing from the spirit or scope of my invention.

I claim:

1. A phonograph record changer spindle for a record player wherein a magazine is provided at one side of the turntable and means is provided for moving records of different sizes out of the magazine toward the turntable and the record is guided into the turntable by the spindle said spindle adapted to be stationarily secured at the axis of a turntable and having a record guiding portion extending in angular relation to one side of the turntable, and means on said spindle for slidable engagement with a record to prevent the record from vibrating the spindle in its passage thereover in the audible frequency range comprising a rib formed in the spindle and extending longitudinally thereon.

2. A phonograph record changer spindle for a record player wherein a magazine is provided at one side of the turntable and means is provided for moving records of different sizes out of the magazine toward the turntable and the record is guided into the turntable by the spindle said spindle adapted to be stationarily secured at the axis of a turntable and having a record guiding portion extending in angular relation to one side of the turntable, and means on said spindle for slidable engagement with a record to prevent the record from vibrating the spindle in its passage thereover in the audible frequency range comprising a rib formed in the spindle and extending longitudinally thereon extending above the surface of the spindle.

3. A phonograph record changer spindle for a record player wherein a magazine is provided at one side of the turntable and means is provided for moving records of different sizes out of the magazine toward the turntable and the record is guided into the turntable by the spindle said spindle adapted to be stationarily secured at the axis of a turntable and having a record guiding portion extending in angular relation to one side of the turntable, and means on said spindle for slidable engagement with a record to prevent the record from vibrating the spindle in its passage thereover in the audible frequency range comprising a wire member secured to the upper surface of the spindle and extending longitudinally along the spindle from a point near the end to a point spaced from the end.

4. A phonograph record changer spindle for a record player wherein a magazine is provided at one side of the turntable and means is provided for moving records of different sizes out of the magazine toward the turntable and the record is guided into the turntable by the spindle said spindle adapted to be stationarily secured at the axis of a turntable and having a record guiding portion extending in angular relation to one side of the turntable, and means on said spindle for slidable engagement with a record to prevent the record from vibrating the spindle in its passage thereover in the audible frequency range, comprising a wire secured at its ends to the spindle and movable by the weight of a rcord relative to the spindle.

5. A phonograph record spindle for a record player wherein a magazine is provided at one side of the turntable and means is provided for moving records of different sizes out of the magazine toward the turntable and the record is guided into the turntable by the spindle said spindle adapted to be secured in a stationary manner at the axis of a turntable and having a portion extending upwardly and curved to extend to one side of the turntable for guiding records onto the turntable, means to prevent the vibration of the spindle in the audible frequency range comprising a longitudinally extending groove in the upper surface of the spindle extending from the free end of the spindle to a point spaced from the end and a wire disposed in said groove and secured in at least one end in the groove.

6. A phonograph record spindle for a record player wherein a magazine is provided at one side of the turntable and means is provided for moving records of different sizes out of the magazine toward the turntable and the record is guided into the turntable by the spindle said spindle adapted to be secured in a stationary manner at the axis of a turntable and having a portion extending upwardly and curved to extend to one side of the turntable for guiding records onto the turntable, means to prevent the vibration of the spindle in the audible frequency range comprising a longitudinally extending groove in the upper surface of the spindle extending from the free end of the spindle to a point spaced from the end and a wire disposed in said groove and secured on at least one end in the groove, said wire being movable in said groove by the weight of a record to be guided by the spindle.

References Cited in the file of this patent

UNITED STATES PATENTS

| | | |
|---|---|---|
| 1,725,237 | Wierth | Aug. 20, 1929 |
| 1,807,073 | Schulz | May 26, 1931 |
| 2,295,092 | Offen | Sept. 8, 1942 |
| 2,371,361 | Small | Mar. 13, 1945 |

FOREIGN PATENTS

| | | |
|---|---|---|
| 403,353 | Great Britain | Oct. 11, 1932 |